(12) United States Patent
Mason, Jr. et al.

(10) Patent No.: US 11,288,125 B2
(45) Date of Patent: Mar. 29, 2022

(54) METHOD AND SYSTEM FOR INTERFACING TO CLOUD STORAGE

(71) Applicant: Nasuni Corporation, Boston, MA (US)

(72) Inventors: Robert S. Mason, Jr., Uxbridge, MA (US); Andres Rodriguez, Boston, MA (US)

(73) Assignee: Nasuni Corporation, Boston, MA (US)

(*) Notice: Subject to any disclaimer, the term of this patent is extended or adjusted under 35 U.S.C. 154(b) by 64 days.

(21) Appl. No.: 16/928,297

(22) Filed: Jul. 14, 2020

(65) Prior Publication Data

US 2020/0349011 A1 Nov. 5, 2020

Related U.S. Application Data

(63) Continuation of application No. 15/433,338, filed on Feb. 15, 2017, now Pat. No. 10,713,119, which is a continuation of application No. 14/531,106, filed on Nov. 3, 2014, now Pat. No. 9,575,841, which is a continuation of application No. 12/508,614, filed on Jul. 24, 2009, now Pat. No. 8,880,474.

(60) Provisional application No. 61/146,978, filed on Jan. 23, 2009.

(51) Int. Cl.
| | |
|---|---|
| *G06F 16/182* | (2019.01) |
| *G06F 11/14* | (2006.01) |
| *G06F 16/11* | (2019.01) |
| *G06F 16/172* | (2019.01) |
| *G06F 16/18* | (2019.01) |
| *G06F 16/901* | (2019.01) |
| *G06F 16/188* | (2019.01) |

(52) U.S. Cl.
CPC ...... *G06F 11/1446* (2013.01); *G06F 11/1448* (2013.01); *G06F 11/1464* (2013.01); *G06F 16/128* (2019.01); *G06F 16/172* (2019.01); *G06F 16/183* (2019.01); *G06F 16/188* (2019.01); *G06F 16/1873* (2019.01); *G06F 16/9027* (2019.01); *G06F 2201/805* (2013.01); *G06F 2201/84* (2013.01)

(58) Field of Classification Search
CPC ..... G06F 16/183; G06F 16/188; G06F 16/172
See application file for complete search history.

(56) References Cited

U.S. PATENT DOCUMENTS

| | | | | |
|---|---|---|---|---|
| 2009/0024814 A1* | 1/2009 | Eisler | ............... | G06F 11/2094 711/162 |
| 2009/0260007 A1* | 10/2009 | Beaty | ............... | G06F 9/5077 718/1 |
| 2010/0161759 A1* | 6/2010 | Brand | ............... | H04L 67/1097 709/218 |

* cited by examiner

*Primary Examiner* — Grace Park
(74) *Attorney, Agent, or Firm* — David H. Judson

(57) ABSTRACT

An interface between an existing local file system and a data store generates and exports to the data store a versioned file system. The state of the local file system at a given point in time can be determined using the versioned file system. In operation, the interface creates and exports to the data store structured data representations, which correspond to versions of the local file system, as well as actual file system data that these structured data representations represent. A cache associated with the interface stores recently used data and metadata, as well as all write data and metadata waiting to be transferred to the data store. Prior to transfer, one or more data transformations may be applied to the data and metadata. In one embodiment, the data store comprises one or more cloud storage service providers. A content control system is used to configure and manage the interface.

1 Claim, 7 Drawing Sheets

METHOD AND SYSTEM FOR INTERFACING TO CLOUD STORAGE

BACKGROUND

Technical Field

This application relates generally to data storage.

Background of the Related Art

In data centers across the world data is growing at an alarming rate. With digitization of content the paperwork of the world is turning into data bits that must be saved, protected and managed. For example, businesses that once had thick physical files and cabinets full of paper now have terabytes of data increasing at a 50% compound annual growth rate (CAGR). What was once a single MRI image is now 5 gigabytes of data for a medical firm to store and protect. The explosive growth in data is felt at all levels from the consumers to the large enterprise. There are different types of data and the invention focuses specifically on the growth of unstructured files, considered to be about 60% of the overall data, as opposed to structured data such as that found in databases, block storage devices and the like.

Unstructured file data is typically stored in local file systems or on network attached file systems (NAS). NAS devices can be built from commercially or freely available software (for example, Windows Server 2003 and Open-Filer). NAS devices also can be provided in physical or virtual (i.e. a VMWare image) forms. NAS devices have flexibility in connecting to directly-attached and storage area network (SAN) attached storage to provide for their storage needs.

The storage industry also has the introduction and growth of storage service providers (SSPs). In recent years, scalable distributed storage devices using commodity hardware have been created by a number of companies. These systems provide a number of basic and advanced attributes including capacity scalability, self healing, performance scaling, duplicate elimination, simple interfaces, etc. Some of these systems were designed and intended for large enterprises to store their fixed-content (archive) information internally, but some of these systems are being connected to the Internet to provide generic storage services. For example, Amazon's S3 service is the leading service of this nature and is being used by many Web 2.0 companies to store and scale their data capacity needs without having to provide their own storage. Storage service providers are essentially utility companies for storage and bill their customers based on the amount of data stored within their service. Amazon's S3 service has been growing rapidly showing the demand for storage provided as a service.

It is also known in the prior art to provide backup services that replicate data to services provided by the Internet. These services use software installed on a client to send data to an Internet service in a proprietary format. These are special purpose SSPs. In addition to these backup offerings, some companies are now providing generic unstructured file services to allow data to be copied to the SSP. These services either provide direct access to the SSP or synchronize files to the SSP. Each one supports a single target SSP and is generally provided as a software application or software service within the computer operating system. Often, both these types of remote storage include provisions for versioning (keeping older copies) of the data and a method to access the data online as well as locally.

BRIEF SUMMARY

An interface between an existing local file system and a data store (e.g., a "write-once" store) generates and exports to the data store a "versioned" file system. The state of the local file system at a given point in time can be determined using the versioned file system. Preferably, the versioned file system comprises a set of structured data representations (such as XML) that comprise metadata associated with the actual file system data. In operation, the interface creates and exports to the data store structured data representations, which correspond to versions of the local file system, as well as the actual file system data that these structured data representations represent. A cache associated with the interface stores recently used data and metadata, as well as all write data and metadata waiting to be transferred to the data store. Prior to transfer, one or more data transformations, such as compression, encryption, de-duplication and the like, may be applied to the data and metadata. The data store comprises any type of back-end storage device, system or architecture. In one embodiment, the data store comprises one or more cloud storage service providers. As necessary, a given structured data representation is then used to retrieve an associated version of the file system. In this manner, the versioned file system only requires write-once behavior from the data store to preserve its complete state at any point-in-time. The cache facilitates near-instant restore of the file system on an as-needed basis. When the interface is positioned in "front" of a generic data store, the interface has the effect of turning that data store into a "versioned file system" ("VFS"). A content control system (CCS) is used to configure and manage the interface.

The foregoing has outlined some of the more pertinent features of the disclosed subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the subject matter and the advantages thereof, reference is now made to the following descriptions taken in conjunction with the accompanying drawings, in which.

DETAILED DESCRIPTION

Figure 1:
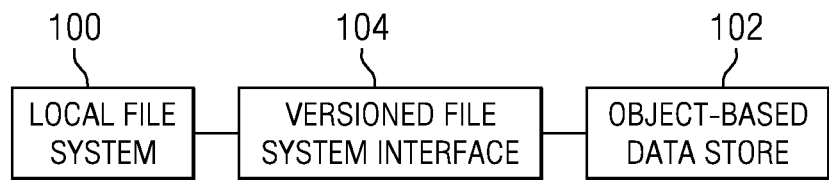
FIG. 1 is a block diagram illustrating how the subject matter of this disclosure interfaces a local file system to an object-based data store.

FIG. 1 illustrates how the subject matter of this disclosure interfaces a local file system 100 to an object-based data store 102. Although not meant to be limiting, preferably the object-based data store 102 is a "write-once" store and may comprise a "cloud" of one or more storage service providers. The subject matter is an interface 104, which provides for a "versioned file system" that only requires write-once behavior from the object-based data store 102 to preserve substantially its "complete" state at any point-in-time. As used herein, the phrase "point-in-time" should be broadly construed, and it typically refers to periodic "snapshots" of the local file system (e.g., once every "n" minutes). The value of "n" and the time unit may be varied as desired.

As will also be seen below, the interface 104 provides for a file system that has complete data integrity to the cloud without requiring global locks. In particular, this solution circumvents the problem of a lack of reliable atomic object replacement in cloud-based object repositories.

The interface 104 as described herein is not limited for use with a particular type of back-end data store. Indeed, as will be seen, when the interface is positioned in "front" of a data store, the interface has the effect of turning whatever is behind it into a "versioned file system" ("VFS"). The VFS is a construct that is distinct from the interface itself, and the VFS continues to exist irrespective of the state or status of the interface (from which it may have been generated). Moreover, the VFS is self-describing, and it can be accessed and managed separately from the back-end data store, or as a component of that data store. Thus, the VFS (comprising a set of structured data representations) is location-independent.

In one embodiment, the VFS resides within a single SSP although, as noted above, this is not a limitation. In another embodiment, a first portion of the VFS resides in a first SSP, while a second portion resides in a second SSP. Generalizing, any given VFS portion may reside in any given data store (regardless of type), and multiple VFS portions may reside across multiple data store(s). The VFS may reside in an "internal" storage cloud (i.e. a storage system internal to an enterprise), an external storage cloud, or some combination thereof.

The interface 104 may be implemented as a machine. Thus, for example, typically the interface 104 is a rack-mounted server appliance comprising hardware and software. The hardware typically includes one or more processors that execute software in the form of program instructions that are otherwise stored in computer memory to comprise a "special purpose" machine for carrying out the functionality described herein. Alternatively, the interface is implemented as a virtual machine or appliance (e.g., via VMWare, or the like), as software executing in a server (or other computing device), or as software executing on the native hardware resources of the local file system. One of ordinary skill in the art will appreciate that the interface 104 serves to transform the data representing the local file system (a physical construct) into another form, namely, a versioned file system comprising a series of structured data representations that are useful to reconstruct the local file system to any point-in-time. Although not meant to be limiting, preferably each structured data representation is an XML document (or document fragment). As is well-known, extensible markup language (XML) facilitates the exchange of information in a tree structure. An XML document typically contains a single root element (or a root element that points to one or more other root elements). Each element has a name, a set of attributes, and a value consisting of character data, and a set of child elements. The interpretation of the information conveyed in an element is derived by evaluating its name, attributes, value and position in the document.

A single appliance may be associated with more one local file system. In such case, the appliance will have multiple VFS instances associated therewith. A given VFS generated by the appliance as described herein may be conceptualized as a "file system in the cloud" or "cloud volume," and each such cloud volume may connect to one or more storage service providers. As used herein, a "volume" is an abstraction that is not tied to any physical location or capacity (except in the general sense of being associated with one or more storage service providers). A volume (or "cloud volume") is simply a "container" for the VFS generated by the appliance. As will be seen, a Volume Manager is provided to enable the user of the appliance to create, administer and manage volumes.

The interface 104 generates and exports to the write-once data store a series of structured data representations (e.g., XML documents) that together comprise the versioned file system. The data representations comprise "metadata" and are stored in the data store. As will be described below, the interface 104 may also perform other transformations, such as compression, encryption, de-duplication, and the like, before exporting the metadata (the VFS) and the data that it represents to the cloud. Preferably, the XML representations are encrypted before export to the data store. The transport may be performed using known techniques. In particular, REST (Representational State Transfer) is a lightweight XML-based protocol commonly used for exchanging structured data and type information on the Web. Another such protocol is Simple Object Access Protocol (SOAP). Using REST, SOAP, or some combination thereof, XML-based messages are exchanged over a computer network, normally using HTTP (Hypertext Transfer Protocol) or the like. Transport layer security mechanisms, such as HTTP over TLS (Transport Layer Security), may be used to secure messages between two adjacent nodes. An XML document and/or a given element or object therein is addressable via a Uniform Resource Identifier (URI). Familiarity with these technologies and standards is presumed.

Figure 2:
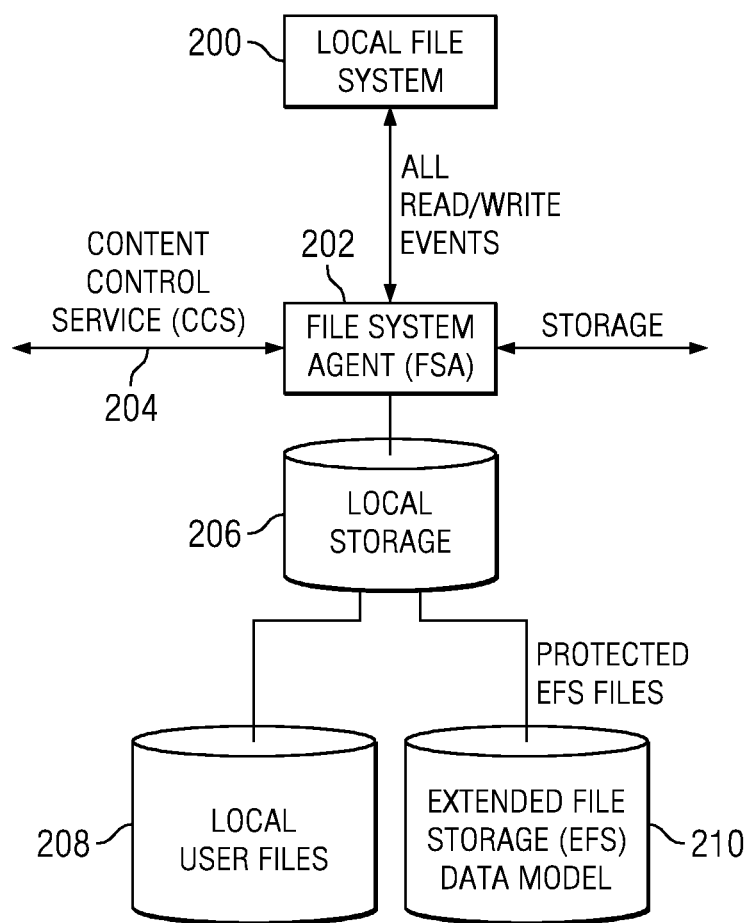
FIG. 2 is a block diagram of a representative implementation of a portion of the interface shown in FIG. 1.

FIG. 2 is a block diagram of a representative implementation of how the interface captures all (or given) read/write events from a local file system 200. In this example implementation, the interface comprises a file system agent 202 that is positioned within a data path between a local file system 200 and its local storage 206. The file system agent 202 has the capability of "seeing" all (or some configurable set of) read/write events output from the local file system. The interface also comprises a content control service (CCS) 204 as will be described in more detail below. The content control service is used to control the behavior of the file system agent. The object-based data store is represented by the arrows directed to "storage" which, as noted above, typically comprises any back-end data store including, without limitation, one or more storage service providers. The local file system stores local user files (the data) in their native form in cache 208. Reference numeral 210 represents that portion of the cache that stores pieces of metadata (the structured data representations, as will be described) that are exported to the back-end data store (e.g., the cloud).

Figure 3:
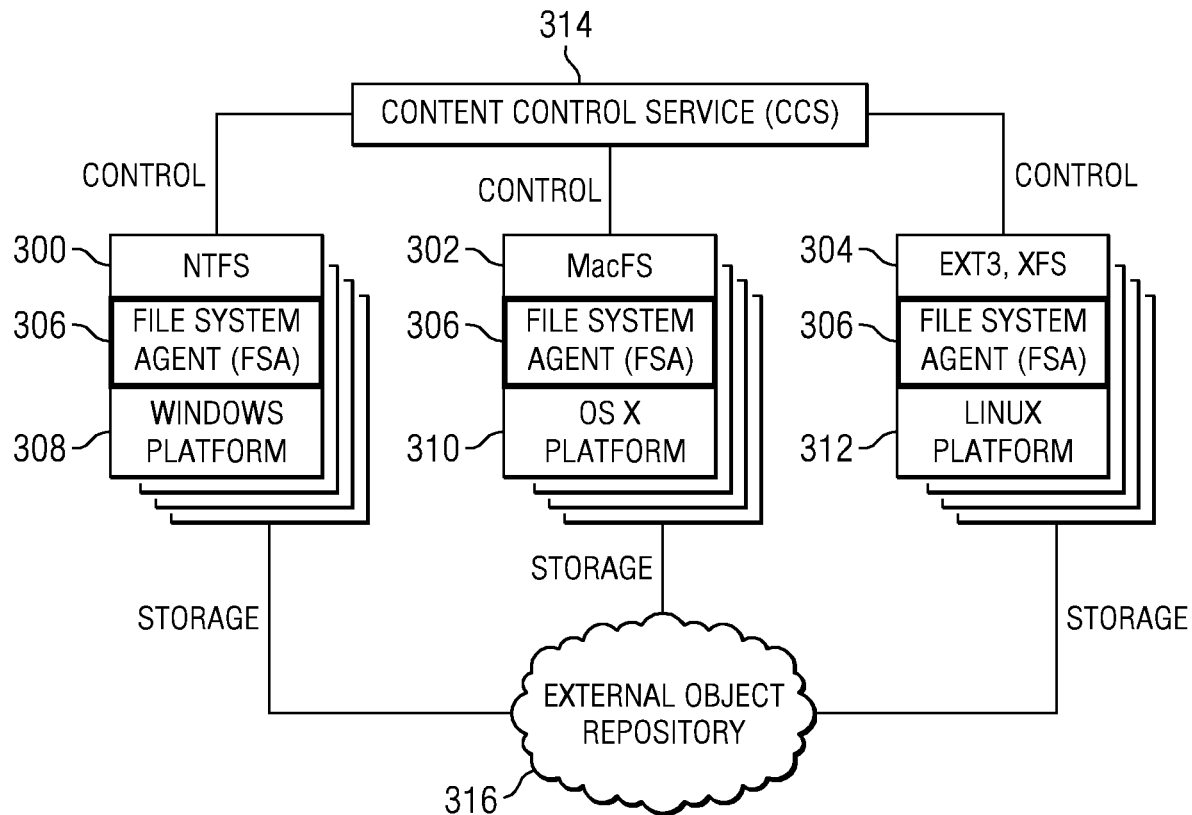
FIG. 3 illustrates how the interface may be implemented in association with different types of local file systems.

FIG. 3 is a block diagram illustrating how the interface may be used with different types of local file system architectures. In particular, FIG. 3 shows the CCS (in this drawing a Web-based portal) controlling three (3) FSA instances. Once again, these examples are merely representative and they should not be taken to limit the invention. In this example, the file system agent 306 is used with three (3) different local file systems: NTFS 300 executing on a Windows operating system platform 308, MacFS 302 executing on an OS X operating system platform 310, and EXT3 or XFS 304 executing on a Linux operating system platform 312. These local file systems may be exported (e.g., via CIFS, AFP, NFS or the like) to create a NAS system based on VFS. Typically, there is one file system agent per local file system. In an alternative implementation, a single file agent may execute multiple threads, with each thread being associated with a local file system. As noted above, conventional hardware, or a virtual machine approach, may be used in these implementations, although this is not a limitation. As indicated in FIG. 3, each platform may be controlled from a single CCS instance 314, and one or more external storage service providers may be used as an external object repository 316. As noted above, there is no requirement that multiple SSPs be used, or that the data store be provided using an SSP.

Figure 4:
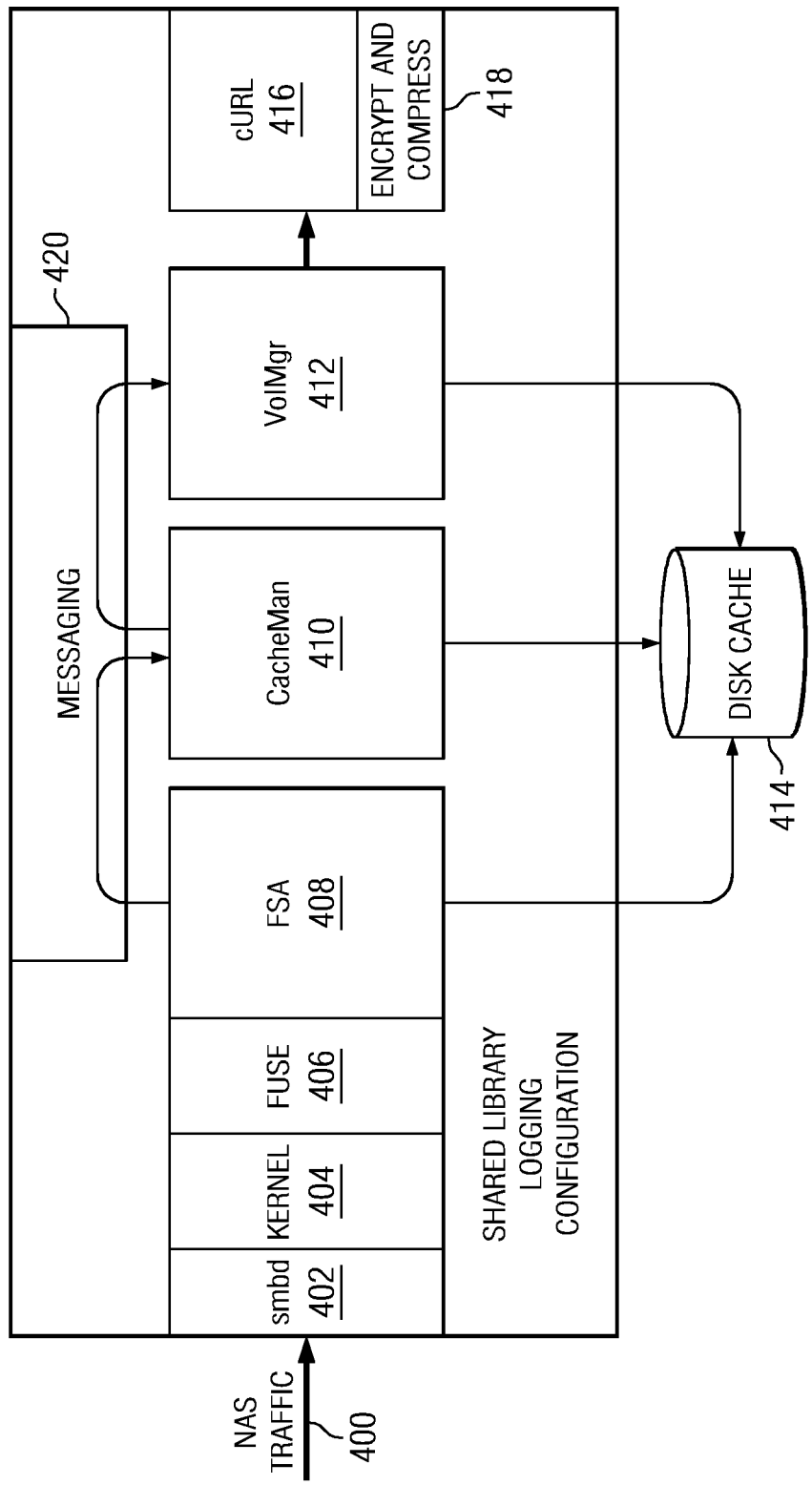
FIG. 4 illustrates the interface implemented as an appliance within a local processing environment.

FIG. 4 illustrates the interface implemented as an appliance within a local processing environment. In this embodiment, the local file system traffic 400 is received (or "intercepted") over Ethernet and represented by the arrow identified as "NAS traffic." That traffic is provided to smbd layer 402, which is a SAMBA file server daemon that provides CIFS (Windows-based) file sharing services to clients. The layer 402 is managed by the operating system kernel 404 is the usual manner. In this embodiment, the local file system is represented (in this example) by the FUSE kernel module 406 (which is part of the Linux kernel distribution). Components 400, 402 and 404 are not required to be part of the appliance. The file transfer agent 408 of the interface is associated with the FUSE module 406 as shown to intercept the read/write events as described above. The CCS (as described above) is implemented by a pair of modules (which may be a single module), namely, a cache manager 410, and a volume manager 412. Although not shown in detail, as noted above preferably there is one file transfer agent instance 408 for each local file system. The cache manager 410 breaks up large files into smaller objects (the chunks) for transfer and storage efficiency, and also because some cloud providers have their own size limits for files. The cache manager 410 is responsible for management of "chunks" with respect to a cache, which in this example is shown as local disk cache 414. The cache may also comprise portions of memory.

The cache manager and the associated caching operations provide significant advantages. Preferably, the cache (disk and/or disk and memory) comprises at least some of the data and metadata already written to the cloud, as well as all of the data and metadata waiting to be written to the cloud. In one illustrative embodiment, the cache is managed by the cache manager 410 such that recently used data and metadata, as well as write data and metadata pending transfer to the cloud is kept local, but typically is only a relatively small percentage of the overall data and metadata stored in the cloud. The cache manager 410 provides intelligent cache management by establishing and maintaining a set of least recently used (LRU) queues or the like and implementing an LRU or other intelligent caching algorithm. This enables the interface to maintain a local cache of the data structures (the structured data representations) that comprise the versioned file system. In effect, data and metadata are staged to the cloud on-demand to provide a "thin provisioning" solution. Importantly, the cache and cache management policies facilitate recovery and "near-instant" restore operations. In particular, using the cache, the file system agent is capable of providing immediate or substantially immediate file system access. The file system agent also can completely recover from the cloud the state of the file system, although that operation of course takes longer than the recovery using locally-cached data and metadata.

Referring back to FIG. 4, the volume manager 412 maps the root of the FSA data to the cloud (as will be described below), and it further understands the one or more policies of the cloud storage service providers. The volume manager also provides the application programming interface (API) to these one or more providers and communicates the structured data representations (that comprise the versioned file system) through a transport mechanism 416 such as cURL. Further details of the volume manager 412 are provided below. cURL is a command line tool for transferring files with URL syntax that supports various protocols such as FTP, FTPS, HTTP, HTTPS, SCP, SFTP, TFTP, TELNET, DICT, LDAP, LDAPS and FILE. cURL also supports SSL certificates, HTTP POST, HTTP PUT, FTP uploading, HTTP form based upload, proxies, cookies, user+password authentication, file transfer resume, proxy tunneling, and the like. Typically, each storage service provider has its own unique API, and there is no requirement that a particular SSP implement any particular storage system (or even have knowledge of the local file system, directories, files, or the like). The appliance, however, is able to interoperate with any such SSP through the use of a plug-in architecture that also supports rapid support for new providers. As noted above, the VFS can reside in any basic data store that supports basic REST-like functions such as GET, PUT, DELETE and the like.

The structured data representations preferably are encrypted and compressed prior to transport by the transformation module 418. The module 418 may provide one or more other data transformation services, such as duplicate elimination. The encryption, compression, duplicate elimination and the like, or any one of such functions, are optional. A messaging layer 420 (e.g., local socket-based IPC) may be used to pass messages between the file system agent instances, the cache manager and the volume manager. Any other type of message transport may be used as well.

As noted above, the components of the interface shown in FIG. 4 may be distinct or integrated. Thus, the specific interface architecture shown in this drawing is merely illustrative and not meant to be taken by way of limitation.

The interface shown in FIG. 4 may be implemented as a standalone system or in association with a service. The interface typically executes in an end user (local file system) environment. In a service solution, a managed service provider provides the interface (e.g., as a piece of downloadable software) and the versioned file system service, the latter preferably on a fee or subscription basis, and the data store (the cloud) typically is provided by one or more third party service providers. The managed service thus operates as a gateway to the one or more cloud service providers. The interface may have its own associated object-based data store, but this is not a requirement, as its main operation is to generate and manage the structured data representations that comprise the versioned file system. The cloud preferably is used just to store the structured data representations, preferably in a write-once manner, although the "versioned file system" as described herein may be used with any back-end data store. Each structured data representations exported to the cloud represents a version of the local file system. Generalizing, the versioned file system is a set of structured data (e.g., XML) objects.

As described above, the file system agent is capable of completely recovering from the cloud (or other store) the state of the native file system and, by using the cache, providing immediate file system access (once FSA metadata is recovered). The FSA can also recover to any point-in-time for the whole file system, a directory and all its contents, a single file, or a piece of a file. These and other advantages are provided by the versioned file system, as described in more detail below.

Figure 5:
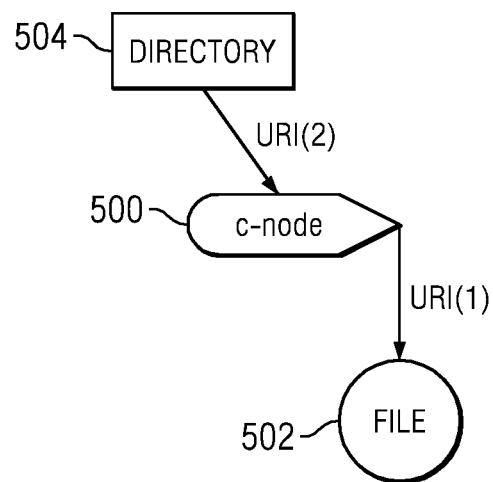
FIG. 5 illustrates a portion of a file system "tree" showing the basic component elements that are used to create a structured data representation of the "versioned" file system according to the teachings herein.

FIG. 5 is a representation of a portion of a tree showing the basic elements that are represented in a versioned file system according to the teachings herein. The reference numeral 500 is a c-node (or "cloud" node). A c-node preferably contains all of the information passed by a file system agent instance about an inode (or inode-equivalent) local file system. As will be seen in the examples below, the inode subset of the c-node includes data that would be returned by a typical "stat" function call, plus any additional extended attributes that are file system-dependent. One or more remaining parts of the c-node are used to provide a CCS super-user with additional access control and portability across specific file system instances. Stated another way, c-nodes preferably act as super-nodes for access control to files and metadata. While the inode sub-structure contains information from the original local file system, c-nodes allow administrators of the system to gain access to files in a portable, file system-independent manner. Preferably, each c-node is addressable by a URI. A c-node preferably also includes a pointer to the actual location of the data file. C-nodes indicate where the remote copies of the item may be found in the data store. The reference numeral 502 is a data file. This object represents the file preferably as it was created in the local file system. One of the main benefits to isolating the metadata in the c-nodes is that a user's data files can be stored with no modifications. As in a traditional file system, preferably the name of the file is stored in the directory or directories that contain it and not as a part of the file itself. Preferably, URIs (for the actual data files in the cloud) remain opaque to the end-users, although this is not a requirement. An FSA instance controls access to the data file URIs through the respective c-nodes. The reference numeral 504 is a directory. Directories are c-nodes that contain a simple list relating names to the corresponding URIs for other c-nodes that, in turn, point to other files or directories. Directories provide a convenient way to establish a namespace for any data set. There can be multiple directories that point to the same files or directories. As in traditional file systems, preferably symbolic links are simply multiple name entries that point to the same c-node. Directories are owned by their own c-node, which preferably holds its metadata and controls access to it.

Figure 6:
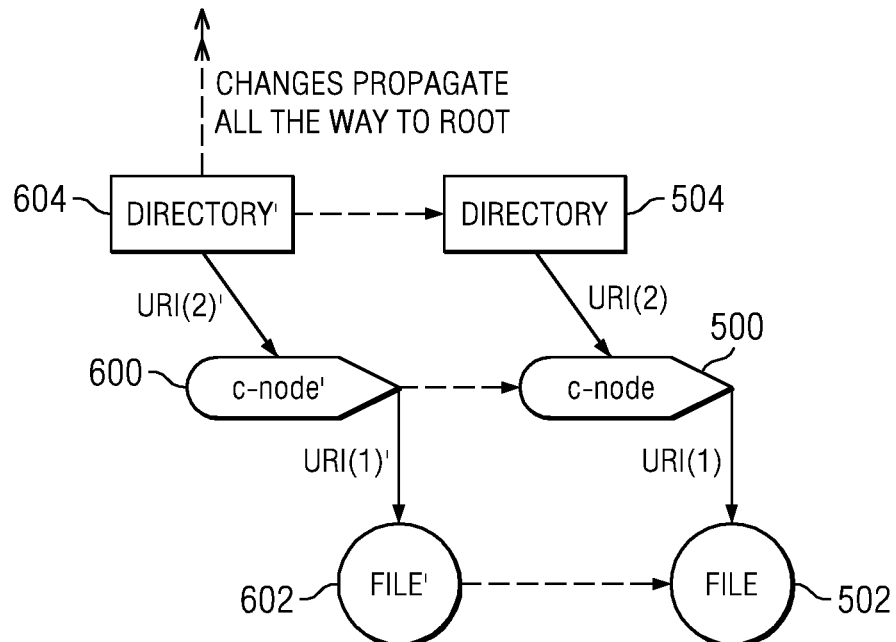
FIG. 6 illustrates the portion of the tree (as shown in FIG. 5) after a change to the contents of the file has occurred in the local file system.

FIG. 6 illustrates the portion of the tree (as shown in FIG. 5) after a change to the contents of the file 502 has occurred in the local file system. In this example, which is merely representative, a new version of the local file system is then created (preferably at a "snapshot" period, which is configurable). The new version comprises the file 602, the new c-node 600, and the new directory 604. As also seen in this drawing, the changes to the tree also propagate to the root. In particular, and according to the teachings herein, upon a given occurrence in the local file system (as will be described), a "new version" of the file system is created (for export to the cloud), and this new version is represented as a new structured data representation (e.g., a new XML document). As will be seen, the new structured data representation differs from the prior version in one or more parent elements with respect to the structured data element in which the change within the file system occurred. Thus, upon a change within the file system, the disclosed interface creates and exports to the data store a second structured data representation corresponding to a second version of the file system, and the second structured data representation differs from the first structured data representation up to and including the root element of the second structured data representation. In this manner, the interface provides for a "versioned" file system that has complete data integrity to the data store without requiring global locks. As noted, this approach circumvents the problem of a lack of reliable atomic object replacement in cloud-based object repositories.

Figure 7:
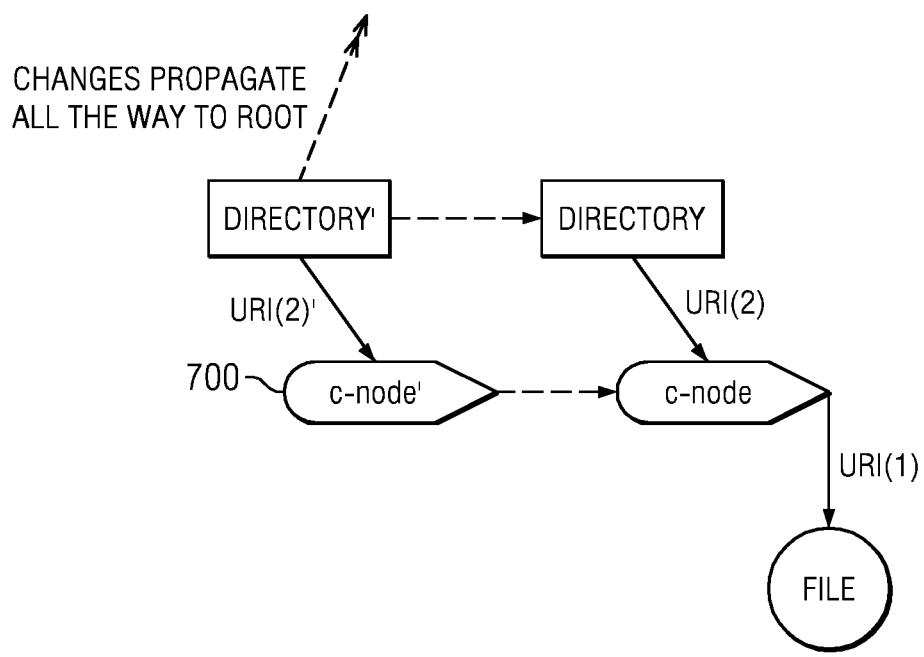
FIG. 7 illustrates the portion of the tree (as shown in FIG. 5) after a change to the contents of the c-node has occurred.
Figure 8:
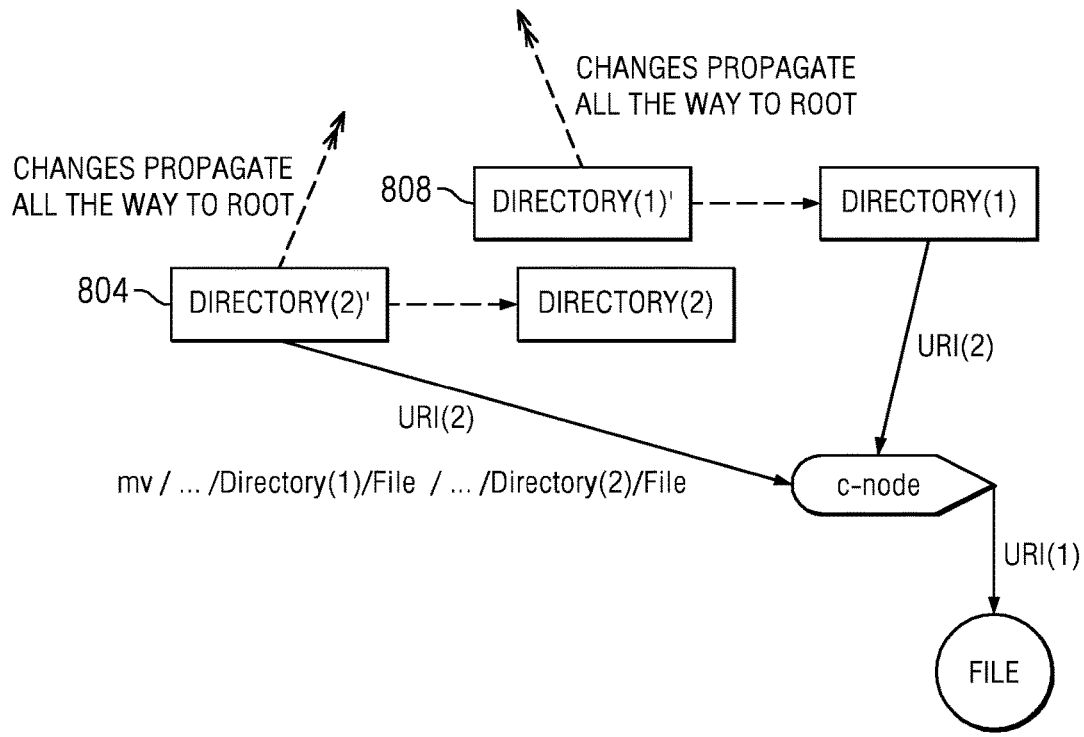
FIG. 8 illustrates the portion of the tree (as shown in FIG. 5) after a change to the contents of a directory has occurred.

FIG. 6 illustrates one type of change (a file update) that triggers the generation of a new version. FIG. 7 illustrates another type of change (an update to c-node 700) that also triggers the generation of a new version with changes propagated to root, and FIG. 8 illustrates yet another type of change (an update to each of the directories 804 and 808) that also implements a new version, once again with changes propagated to root. Generalizing, while the types of changes that trigger a new version may be quite varied, typically they include one of the following: file creation, file deletion, file modification, directory creation, directory deletion and directory modification. This list is not intended to be taken by way of limitation.

Figure 9:
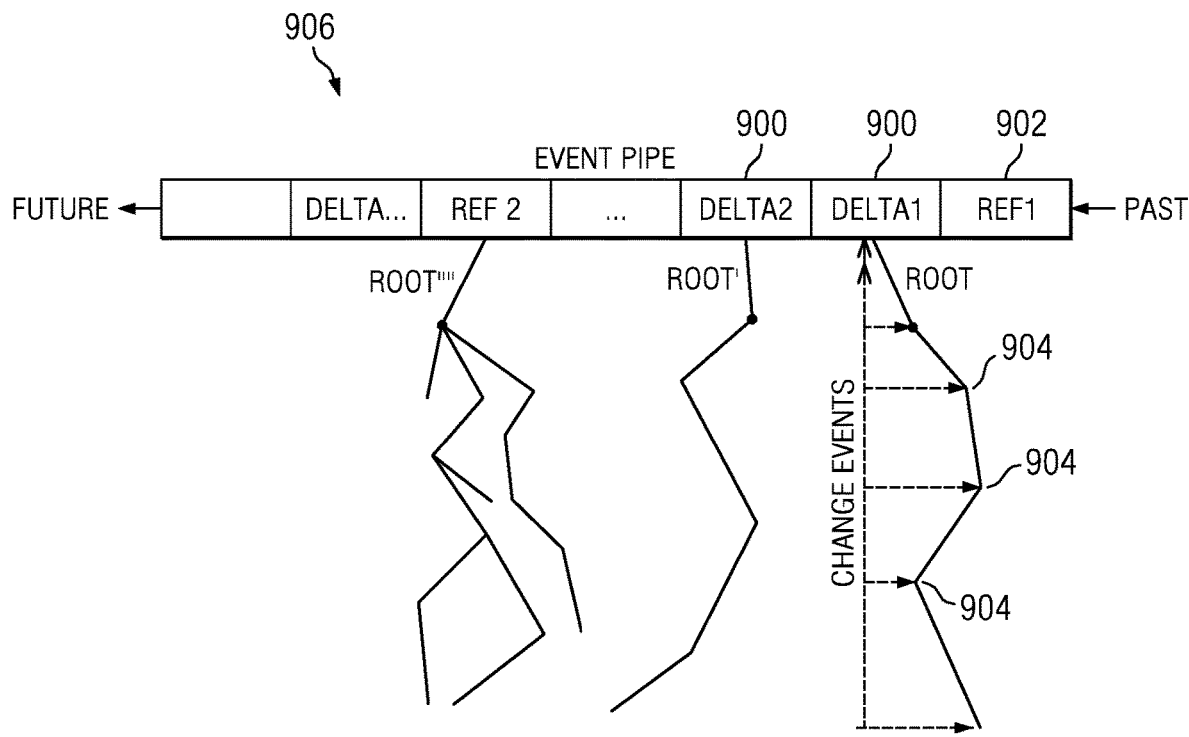
FIG. 9 illustrates how a number of file changes are aggregated during a snapshot period and then exported to the cloud as a new version.

Moreover, as noted, it is possible but not required that a new version be created at the time of the actual change in the local file system; typically, the new version is created after a "snapshot" of the local file system is taken, and a number of change events may occur during a given snapshot period. FIG. 9 illustrates this approach. As seen in this drawing, an FSA instance preferably aggregates all of the changes to the local file system in two ways: delta frames 900, and reference frames 902. The delta frames 900 control the number (and size) of the objects that need to be stored in cloud storage. As noted above, preferably every local file system event is recorded by the FSA instance as a change event 904. As noted, new inodes, directories and files trigger corresponding new entities (created by FSA) in the cloud; however, preferably modifications to existing structures create change events that are aggregated by FSA into a single new entity, the delta frame 900. A delta frame 900 starts with a new root that represents the current state of the file system. Preferably, the FSA instance compiles the delta frame information such that each of the new entry points (i.e. any modifications to the previous version) to c-nodes, directories and files are represented as new versions of the data structures plus pointers to the old structures. To reconstruct the current state of a local file system, an FSA client only has to walk a tree for any version to see all the correct items in the tree. Reference frames 902 are also compiled by FSA and contain an aggregation of the previous reference frame plus all the intervening delta frames.

A given reference frame 902 may be thought of as an entire copy with no references to previous versions, while a delta frame 900 may be thought of as including pointers to older versions. In other words, a delta frame logically is a combination of a current version and one or more prior versions. Each reference frame may be considered a complete file system from a tree-walk perspective. This means that a walk of the tree, by itself, is all that is required to restore the file system to its associated state or point-in-time (as represented by the tree). For storage purposes, it should also be appreciated that a delta frame only takes the space required for the difference from the previous version, whereas a reference frame takes up the space of the file system. If it is desired to collapse (delete) versions, the system may create an intact reference frame following a string of deleted delta frames.

When it is desired to reconstruct the file system to a point in time (or, more generally, a given state), it is only required to walk (use) a single structured data representation (a tree). In other words, one and only one VFS tree may be used to identify a prior state of the local file system. It is not required to jump across multiple trees for this purpose.

Figure 10:
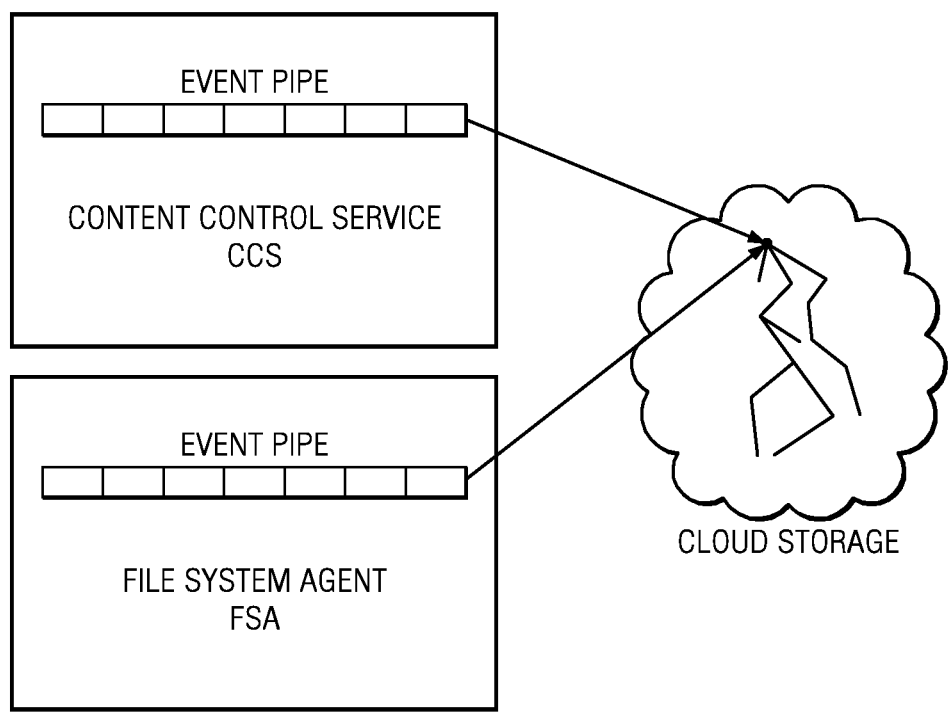
FIG. 10 illustrates how CCS maintains an event pipe.

Frames preferably are stored in an event pipe 906. As will be seen, the event pipe is implemented in a structured data representation as a table of contents (TOC), although this is not a limitation. Preferably, this data structure is held both at the FSA instance and at CCS, as illustrated in FIG. 10. The event pipe (with its entry points into cloud storage) is then the primary means to access all files stored remotely. In particular, one of ordinary skill in the art will appreciate that this is a lightweight data structure that preferably contains only versions of root for the given volume. Although it is desired that CCS be highly available, preferably the "writes" occur periodically in a transaction safe way as controlled by FSAs. The "reads" are only necessary when an FSA copy has failed; therefore, CCS can be run using an ordinary (high-availability) database or file-based back-end. Preferably, the mix of delta and reference frames in the event pipe is chosen to balance storage and bandwidth utilization against a practical recovery time for FSA to create a new local file system instance. The composition of the event pipe can also be set according to a configurable policy. For instance, users may choose to keep only so many versions or versions dating back to a specific date. If desired, a rotation schedule can be specified at CCS such that, for instance, deltas are kept daily for a month and then rolled into a monthly reference frame.

As noted above, the VFS comprises a series of structured data representations that are exported to the cloud. Typically, a simple directory tree is pushed to the cloud as a version. As one or more changes in the local file system occur, a new version of that tree is exported, with changes to root propagated described. Preferably, data is not deleted, overwritten or updated, and any version can be retrieved from the cloud at any given time.

The following provides additional details regarding the Content Control Service (CCS). As noted above, the CCS is responsible for the configuration and control of one or more FSA instances that belong to a VFS implementation. CCS also serves a layer of indirection between the FSA instances and their current representation in the cloud. Preferably, CCS is executed as a software service in the cloud via web-based portal access, although this is not a limitation. The CCS web portal provides administrators a set of familiar tools that act similarly to traditional volume management functions.

A customer owns a set of volumes. A volume is the point of indirection that separates the logical from the physical implementations, the file systems from the actual storage cloud. The administrator of that set has access to manage the volumes. Through CCS, the administrator (the user) controls read/write access, number of copies to the cloud, and other high level permissions and attributes, preferably at the volume level. To create a new, empty volume, preferably the administrator uses the CCS web portal to create a new volume. There is no need to associate disks with the new volume; rather, all that is needed is the volume name.

CCS preferably contains a registry for the FSA instances. The registry is used to authenticate each FSA opening access to its corresponding cloud store. In a typical use case, an entity (such as an organization, an individual, a computing system, or the like), registers with a service provider, which provider provides the VFS "gateway" service. An administrator (or other user) is permitted to access and to configure the organization's use of the system. In use, the administrator logs into the CCS, e.g., via a web-based portal, and sees the file system agents that are associated with (belong to) the organization. The administrator can navigate his or her collection of file system agents (corresponding to file system instances) and perform configuration and management functions such as: set and change a configuration for an FSA, upgrade FSA software, create and delete an FSA, activate and suspend an FSA, change ownership of an FSA, migrate back-end FSA remote storage repository, and one or more volume manager operations that are described in more detail below. Preferably, the CCS also allows the administrator the ability to set quotas in bulk for storage and bandwidth utilization. It also aggregates reporting information from one or more reports generated by the file system agents for the organization. Preferably, any errors reported to the CCS (e.g., a failure to find an object in the cloud) are reported in CCS via the portal access.

CCS also performs management of the encryption keys used to encrypt data sent to the cloud. The CCS manages those keys and enables customers to generate new keys or use existing keys to encrypt their data.

Figure 11:
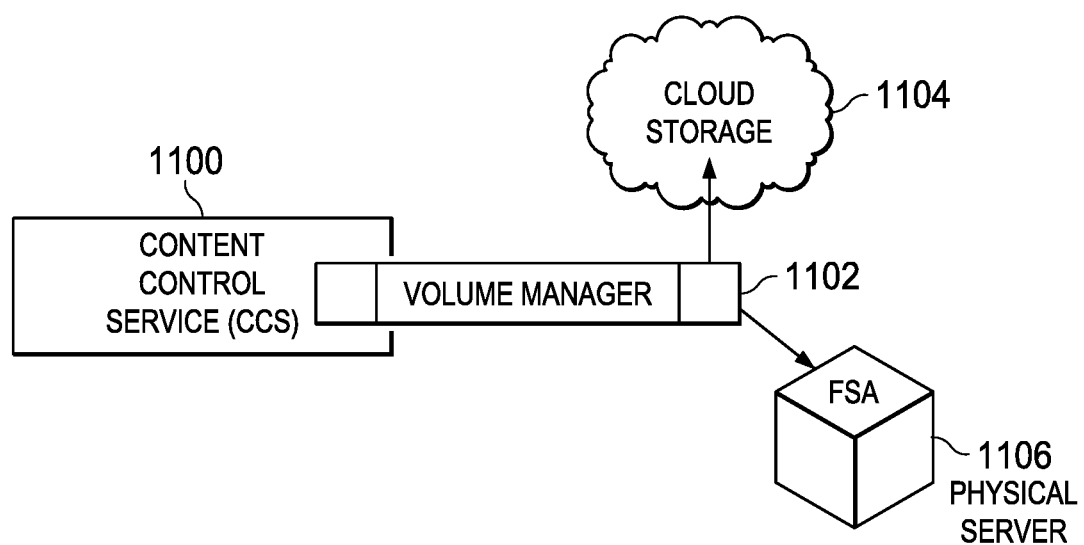
FIG. 11 illustrates how the CCS Volume Manager allows one or many VFS roots to be mounted to an FSA instance associated with a physical server.

As illustrated in FIG. 11, a Volume Manager 1102 preferably runs in the CCS 1100 and maps the root of the VFS data structure 1104, or volume, to physical servers 1106. To execute any write operations in the data model, preferably at least one server running an FSA instance must be mapped to it. Assuming proper access credentials, an FSA can read from a volume that has no FSA association. Preferably, volumes persist in the cloud even when there are no FSAs associated with them. As noted above, a volume is an abstraction that represents a container for a given VFS. FSA instances can exist either in the remote local file systems being managed, or they can be instantiated in a compute layer that is logically close to the cloud storage. The Volume Manager 1102 allows one or many VFS roots to be mounted in a single FSA instance. Preferably, each root defines its own namespace that is identified by the name of the volume. In this way, the volumes behave as in a traditional Unix-based file system. A given volume may store copies of metadata and data at multiple clouds for replication. Or, a pair of volumes may be mounted to a single FSA where each volume stores in a different cloud. There may be multiple volumes associated with an FSA instance or, conversely, there may be multiple FSA instances associated with a single volume. A VFS root may exist without having an FSA associated with it. In this circumstance, the data set is physically present; however, users cannot perform operations on the set. The Volume Manager 1102 also contains one or more control routines to facilitate data replication to multiple remote object repositories. The Volume Manager 1102 may also migrate volumes from one remote storage repository to another.

The following section provides additional description regarding the behavior of the data model in typical Information Technology (IT) use cases. These scenarios are composed from a set of primitive operators that can be combined to create complex data management behaviors. Unless otherwise indicated, this functionality is implemented by the CCS and supported by the appliance.

Preferably, the operators are executed by FSA instances. A given operation may be executed a by a different FSA than the one that stored the data originally. The basic operators are based on the commands of the Unix file system, with several important differences. The operators work across volumes even if those volumes are mounted on different FSA instances. Moreover, preferably operators work on the directory structures as they exist in time. Preferably, the operators obey access control privileges defined in the c-nodes. The operations at this level typically are for administrators of the system working through the CCS at the volume level. Local file system operations typically are performed at the local level using already available file system tools.

Create

This operation creates a new volume, identifies the cloud SSP that will be used to store the volume, identifies the number of copies of the volume that should be created, as well as specifies other volume level operations such as encryption level, encryption keys, and the like. Thus, one or more additional parameters, such as the cloud repository to use, replication to multiple clouds, and so forth, are set with this command. Preferably, no other operations can be performed until the volume is associated with an FSA.

Mount and Unmount (Mount and Unmount)

This operation associates or de-associates an existing volume with an FSA.

Move (Mv)

This operation moves a c-node from a source to a destination. If no additional parameters are specified, the movement occurs from the present version of the source. In addition, a time variable may be used to specify a particular directory version to be removed from the source. Preferably, moving a complete directory structure involves only versioning the parent c-node to terminate at the source, which indicates that the child is no longer attached to it. A target c-node is then created or versioned from an existing one to point to the directory store. This is a lightweight operation, as none of the children are affected by this operation, and none of the data is actually moved. Preferably, a move is executed at root and at a certain point in time, although this is not a limitation. Thus, for example, a move can be applied at the sub-directory level.

Link (ln)

This operation connects a new c-node on the source to a destination. There is no change to the destination c-node. The links allow for file transversal to jump across volumes. Preferably, the new c-nodes created as a result of this operation have their own access control; however, in the event that the volumes are mounted in a different FSA, care must be taken to enforce the write permissions of the owning volume at the FSA. Link basically works like Move, only the ownership of the target remains with the original c-node. The same time parameter preferably applies for the destination.

Copy (Cp)

This operation copies the c-nodes and the data files for the source to the destination. At the volume level, this operation preferably is performed from a compute layer that has ample bandwidth to the storage. Preferably, a Copy command leaves no links to the source. New instances of c-nodes and data files are then created from the source. Copy (like Move) specifies the same time parameter behavior for its source.

Remove (Rm)

This operation changes a version and view of the volume but typically does not remove any data from the cloud. The operation creates a new version in the VFS data structure that, in effect, terminates the old i-nodes leaving intact all of the previous versions. The operation may specify a moment in time, and it merely changes the version/view to exclude data. The data remains in the cloud for recovery purposes.

Purge

This operation enables the user to clean up/prune space used in the cloud. This operation removes history, and it deletes the c-node and all of its children. This operation may be executed to reduce storage.

Change Mode (Chmod)

This operation accesses the c-node security layers and allows the administrator to change the attributes of a volume or part of the directory structure.

Disk Usage (Du)

This operation behaves similarly to its Unix equivalent by providing statistics about the file system.

The VFS offers data management capabilities by combining the basic operators. Preferably, the FSA client performs some of the data management operations and administrator clients (preferably executing near the cloud storage) may perform some of the other operations. The list below is merely representative.

Provisioning

A user that wants to create a new instance from scratch would choose to instantiate a new volume. The user would then link his or her local FSA instance to this volume. The user would be able to choose a cloud to associate with the Volume as well. Preferably, the level of caching done by the FSA client is defined locally at the client by providing available cache space.

Migration

Using the Volume Manager, the administrator unmounts an old FSA client and then mounts a new FSA to the same volume. Metadata flows back first to enable the file system to come quickly back online.

Merging NAS

The administrator moves the volumes responsible for the servers being merged into either a new single volume or into one of the existing volumes. Ownership of those data structures is transferred to the new volume by the Move command.

Split NAS

The administrator moves part of a volume (picking the appropriate directory) to a new volume with its new matching FSA. This split can happen anywhere in a current directory or at a particular point in time (version set).

Recovery

Recovery of a full volume is the same as a migration. Performing a file or directory level restore to a certain point in time preferably involves either a linking from a present created directory (called, say, /Restored Files) to a desired point in time. The entry point for this recovery mode can be a point in time or an object (file or directory). The administrator can then choose to move individual files or directories into the present or roll-back the whole system to a certain point in time.

Archiving

A script may be executed to select a specific moment in time and move the files to an Archive Volume. At the same time, if continued access is desired from the old Volumes, the script may link the old file names to the Archive Volume.

Disposition

A script may be executed to select a certain point in time and remove all entries. This is the purge operation. Preferably, this operation is run asynchronously in bandwidth proximity to the remote object repository.

Other scenarios may include indexing the data (Discovery) by moving it to an external service, de-duplication (assuming object transparency), integrity checks, content distribution using third party providers, and so forth.

The described subject matter provides numerous advantages. The interface provides a primary, local, but non-resident file system to facilitate storage of user data and file system metadata one or more storage service providers. The FSA provides a caching system comprised of local cache storage and algorithms for provisioning file system data and metadata to the local client. A versioning system implemented in the file system and part of the file system metadata structure provides backup and disaster recovery functions. The described framework leverages security, ACL and other standard attributes of a local file system. The subject matter herein provides support for multiple storage service providers. It also enables protection of data (e.g., via mirroring, RAID, or the like) across and within storage service providers.

The FAS enables full functionality (reads, writes, deletes) during periods of outage by the storage service providers (with the exception of read/access of uncached data). Preferably, the FAS provides a cache collision avoidance mechanism to avoid data loss. The FAS also preferably provides an audit log at the file system object (directory, file) level that includes the history of the objects (create, update, rename/move etc). It also performs internal integrity checks by comparing system metadata and data against the data stored in the storage service providers. The FSA preferably maintains cryptographic hashes of file data (in its entirety or in portions) within file system metadata for the purposes of data integrity checking.

Using the CCS, the system administrator can provision volumes that provide multiple top level directories for management purposes. Volume level operations allow the movement of portions of the namespace between system instances. Volume level properties control attributes for the system instances and for the use of the storage service providers. Volume level metrics provide information about the use and capacity of the volumes. Preferably, customers of the service can create multiple instances of the system, and portions of the namespace can be shared between copies of the system.

The disclosed technique enables quick restore of file system metadata from the storage service providers. The system also enables full system access with only resident metadata thus providing near-instant recovery of failed systems for disaster recovery scenarios. As noted above, preferably data and metadata saved in the cloud (the one or more storage service providers) is encrypted but shareable by control of the system administrator. The system preferably also limits limit bandwidth consumption by sending to the cloud only incremental changes. The system preferably limits space consumption by saving to the cloud only incremental changes. More generally, the service enables customers to create instances of the system within a cloud computing layer (i.e. Amazon EC2) to allow system administrators to execute global operations. This enables entities to provide value-added services.

The system has the additional attributes of being able to be CIFS- and NFS-exportable to provide NAS functionality. Further, the system may be instantiated in a virtual machine.

The system preferably reduces duplicate data by using metadata to reference the same data multiple times, and by using metadata to reference sub-file fragments of the same data multiple times.

The Content Control Service (CCS) provides additional advantages. It provides a web-based portal to manage the service. Using CCS, system administrators create and manage volumes, provide access to volumes to others outside their organization, monitor system metrics, manage FSA instances, and subscribe and manage one or more other service features.

The appliance provides a secure and reliable link between network attached storage (NAS) and a cloud store. It caches and provides thin provisioning of the cloud to deliver virtually unlimited storage capacity among one or more storage locations, and it facilitates data snapshots and secure sharing among those locations. Preferably, the subject matter described herein is packaged as a virtual NAS appliance, although this is not a limitation, as has been described. The appliance preferably implements a simple web-based interface that is easy-to-use, and that allows access to multiple storage clouds from a single control panel. The appliance provides full support for known technologies such as Windows Shares, CIFS and Active Directory. In use, the user creates volumes out in the storage clouds and publishes them, preferably as Windows Shares (although this is not a limitation). The interface also facilitates advanced features such as snapshots and rollbacks.

The disclosed subject matter integrates traditional file systems with cloud storage, simplifying file management. It simplifies storage by providing one platform that addresses all of the key areas of storage management, namely, protection, provisioning and file portability. By combining these attributes into an integrated platform, the disclosed subject matter significantly reduces storage management expense and complexity. In a preferred embodiment, enhanced protection is provided in several ways: security, backup and disaster recovery. With respect to security, preferably all data is sent to the cloud encrypted. Preferably, data is encrypted at a user premises using known technologies (e.g., OpenPGP with AES-256) and remains encrypted in the cloud. This guarantees end-to-end protection of customer data, which is never visible to the service provider or to the cloud vendors. Backup and restore also are built into the VFS, as all changes to the local file systems are versioned, and the VFS stores them in the cloud and keeps track of all versions, past and present. A user can roll back to any version without having to do a traditional restore. Disaster recovery also is intrinsic to the VFS because all data exists in the cloud, and the cloud architecture inherently protects data with copies in multiple locations. A single cloud typically is robust enough for most users, although extra protection can be provided by associating the data to multiple clouds.

The platform also provides enhanced provisioning in the form of unlimited capacity and multi-cloud support. The VFS allows thin-provisioning, and it turns a local file system into a cache for the cloud. As a result, the VFS grows continuously in the cloud and delivers unlimited storage to customers. Preferably, the platform optimizes data in the cache, working within the constraints of the local storage capacity while maximizing performance and reducing unnecessary network traffic to the cloud. Moreover, the VFS can be provisioned by more than one cloud, allowing customers to select vendors according to price, quality of service, availability, or some combination thereof. Thus, for example, a customer may a first set of user files to a less-expensive cloud while sending a more sensitive second set of files to a compliance-grade cloud. Preferably, the data is de-duplicated and compressed before being sent to the cloud to reduce network traffic and storage costs.

As noted above, the platform also provides enhanced portability. A VFS file retains forever its history, but it is not dependent on any particular instance of the system. Files are stored in the cloud in their native forms while the VFS accumulates metadata including the locations, history, associations, and the like of the individual files. This allows customers to easily migrate file servers, to combine them, and to share data with other organizations. It also enables partners to introduce value-added services such as compliance, search, archiving and the like.

The subject matter disclosed herein thus provides a virtual appliance that acts as a gateway that enables the cloud storage of files. A service provider provides the appliances to its users (customers), and it may offer an SSP gateway (or "access") service to those users in the form of the CCS and other ancillary services, such as billing. In an illustrative use case, a customer registers with the service, downloads and installs the virtual appliance in its data center, and then configure the one or more volumes (through CCS) to gain access to one or more (preferably third party) storage clouds. The service provider acts as a go-between that continuously monitors cloud performance and availability, and makes that information available to its customers. It provides customers a choice among cloud vendors to facilitate the full potential of multi-vendor cloud storage. Preferably, the service provider itself does not host or otherwise store the customer's data and the metadata (the VFS) generated by the appliance, although this is not a requirement.

One of ordinary skill in the art will appreciate that the interface described herein provides a primary, local, but preferably non-resident application layer to interface the local file system to the data store. As has been described, the interface caches user data and file system metadata (organized in a unique manner) to the data store (e.g., one or more SSPs), preferably as a service. The metadata provides a level of indirection (from the data), and the VFS enables it to be stored separately from the data that it represents.

As noted above, XML is a preferred format for the structured data representation. XML is a subset of SGML (the Structured Generalized Markup Language). Thus, the structured data representation as used herein may be based on SGML, any variant or subset thereof, on a relational database model, or any other generic data model that provides a defined way to structure, describe, and interchange data.

While the above describes a particular order of operations performed by certain embodiments of the disclosed subject matter, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While the disclosed subject matter has been described in the context of a method or process, the subject matter also relates to apparatus for performing the operations herein. This apparatus may be specially constructed for the required purposes, or it may comprise a computer selectively activated or reconfigured by a computer program stored in the computer. Such a computer program may be stored in a computer readable storage medium, such as, but is not limited to, any type of disk including an optical disk, a CD-ROM, and a magnetic-optical disk, a read-only memory (ROM), a random access memory (RAM), a magnetic or optical card, or any type of media suitable for storing electronic instructions, and each coupled to a computer system bus. A computer-readable medium having instructions stored thereon to perform the interface functions is tangible.

A given implementation of the disclosed subject matter is software written in a given programming language that runs on a server on an Intel-based hardware platform running an operating system such as Linux. As noted above, the interface may be implemented as well as a virtual machine or appliance, or in any other tangible manner.

While given components of the system have been described separately, one of ordinary skill will appreciate that some of the functions may be combined or shared in given instructions, program sequences, code portions, and the like.

Having described the subject matter, what we claim is as follows.

The invention claimed is:

1. Apparatus to configure and manage storage for an enterprise, comprising:
   one or more hardware processors;
   computer memory associated with each hardware processor to hold computer software executed by the hardware processor, wherein the computer software comprises:
   first computer software configured as a management interface to receive input that provisions and manages a scalable file system across a cloud of one or more cloud-based storage service providers, wherein the input defines a volume, and one or more attributes associated with the volume, wherein the volume is a logical construct representing a point of indirection separating the scalable file system from storage resources in the cloud; and
   second computer software configured as a file system interface to represent, to the enterprise, a local file system whose inode structure and data are stored in one or more cloud-based storage service providers in a write-once, read-many manner;
   wherein a capacity of the scalable file system is thinly-provisioned and adjusted continuously as the file system interface exports, into the volume, its local file system inode structure and data to the one or more cloud-based storage service providers, the capacity scaling continuously and as needed to store the local file system inode structure and data;
   wherein the local file system provides a cache for the cloud.

* * * * *